(12) United States Patent
Kuriakose et al.

(10) Patent No.: US 11,348,472 B2
(45) Date of Patent: May 31, 2022

(54) SYSTEM AND METHOD TO AUTOMATICALLY CONSTRUCT A FLIGHT PLAN FROM A DATA SET FOR AN AERIAL VEHICLE

(71) Applicant: HONEYWELL INTERNATIONAL INC., Morris Plains, NJ (US)

(72) Inventors: Sanju Kuriakose, Bangalore (IN); Anoop S, Bangalore (IN); Sabu Mathew, Bangalore (IN); Niranjan Kumar, Bangalore (IN); Jan Hart, Glendale, AZ (US); Janaki Seetharaman, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 59 days.

(21) Appl. No.: 16/904,227

(22) Filed: Jun. 17, 2020

(65) Prior Publication Data

US 2021/0343159 A1    Nov. 4, 2021

(30) Foreign Application Priority Data

Apr. 29, 2020    (IN) .............................. 202011018322

(51) Int. Cl.
  *G08G 5/00*    (2006.01)
  *G06F 16/29*   (2019.01)

(52) U.S. Cl.
  CPC ........... *G08G 5/0034* (2013.01); *G06F 16/29* (2019.01); *G08G 5/006* (2013.01); *G08G 5/0039* (2013.01)

(58) Field of Classification Search
  CPC ....... G08G 5/006; G08G 5/0039; G06F 16/29
  See application file for complete search history.

(56) References Cited

U.S. PATENT DOCUMENTS 6,789,768 B1   9/2004   Kalisch
9,984,578 B2   5/2018   Myren et al.
(Continued)

FOREIGN PATENT DOCUMENTS

CN    102570345 A    7/2012
CN    204415743 U    6/2015
(Continued)

*Primary Examiner* — James J Lee
*Assistant Examiner* — Shon G Foley
(74) *Attorney, Agent, or Firm* — Lorenz & Kopf, LLP (57) ABSTRACT

A system for automatically constructing a flight plan that aligns with a boundary line is provided. The system has a controller that is configured to: automatically select a set of geographical (geo) coordinate waypoints along a boundary line using waypoints from the geographical database responsive to flight crew input; refine the set of geo coordinate waypoints using a calculated turn initiation distance and a turn completion distance for every waypoint; further refine the refined set of geo coordinate waypoints based on the course change between waypoints; generate a set of courses and distances between waypoints through computing, for each set of two consecutive waypoints in the further refined set of geo coordinate waypoints, the course and distance between the two consecutive waypoints; and construct the flight plan based on the waypoints in the further refined set of geo coordinate waypoints and the set of courses and distances between waypoints.

20 Claims, 6 Drawing Sheets

(56) References Cited

U.S. PATENT DOCUMENTS

| | | | |
|---|---|---|---|
| 2014/0032019 A1* | 1/2014 | Courteville | G08G 5/0052 |
| | | | 701/3 |
| 2016/0307447 A1 | 10/2016 | Johnson et al. | |
| 2017/0323570 A1 | 11/2017 | Myren et al. | |
| 2020/0020237 A1 | 1/2020 | Grimald et al. | |

FOREIGN PATENT DOCUMENTS

| | | |
|---|---|---|
| CN | 106125764 A | 11/2016 |
| CN | 109557942 A | 4/2019 |
| CN | 110567439 A | 12/2019 |

* cited by examiner

SYSTEM AND METHOD TO AUTOMATICALLY CONSTRUCT A FLIGHT PLAN FROM A DATA SET FOR AN AERIAL VEHICLE

CROSS REFERENCE TO RELATED APPLICATION

This application claims priority to Indian Provisional Patent Application No. 202011018322, filed Apr. 29, 2020, the entire content of which is incorporated by reference herein.

TECHNICAL FIELD

Embodiments of the subject matter described herein relate generally to flight deck systems. More particularly, embodiments of the subject matter relate to the generation of flight plans using flight deck systems.

BACKGROUND

The current computer-controlled navigation systems do not provide a means to automatically generate a flight plan or an offset flight plan from a data set, requiring a pilot to enter each waypoint manually. Examples of a data set are: state or country boundaries, other geographical boundaries such as rivers, mountain contours or data for other search and rescue criteria, etc. It can be a challenging and tedious task to manually construct a flight plan that aligns precisely with the various boundaries to perform monitoring or searching.

A search and rescue mission might be along a river or in a mountainous area where an existing type of search pattern would not produce the needed coverage. Country and state boundaries may need monitoring, and manually constructing a flight plan to monitor the boundaries can be tedious.

Hence, it is desirable to provide systems and methods for automatically constructing a flight plan. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A processor-implemented system for automatically constructing a flight plan for an aerial vehicle that aligns with a boundary line using information from a geographical database is disclosed. The system has a controller that includes one or more processors configured by programming instructions on non-transitory computer readable media. The controller is configured to: automatically select a set of geographical (geo) coordinate waypoints along a boundary line using waypoints from the geographical database responsive to flight crew input; refine the set of geo coordinate waypoints using a calculated turn initiation distance (TID) and a turn completion distance (TCD) for every waypoint; further refine the refined set of geo coordinate waypoints based on the course change between waypoints; generate a set of courses and distances between waypoints through computing, for each set of two consecutive waypoints in the further refined set of geo coordinate waypoints, the course and distance between the two consecutive waypoints; and construct the flight plan based on the waypoints in the further refined set of geo coordinate waypoints and the set of courses and distances between waypoints. The flight plan is flown by the aerial vehicle.

A processor-implemented method in flight deck equipment for automatically constructing a flight plan for an aerial vehicle that aligns with a boundary line using information from a geographical database is disclosed. The method includes: automatically selecting a set of geographical (geo) coordinate waypoints along a boundary line using waypoints from the geographical database responsive to flight crew input; refining the set of geo coordinate waypoints using a calculated turn initiation distance (TID) and a turn completion distance (TCD) for every waypoint; further refining the refined set of geo coordinate waypoints based on the course change between waypoints; generating a set of courses and distances between waypoints through computing, for each set of two consecutive waypoints in the further refined set of geo coordinate waypoints, the course and distance between the two consecutive waypoints; and constructing the flight plan based on the waypoints in the further refined set of geo coordinate waypoints and the set of courses and distances between waypoints. The flight plan is flown by the aerial vehicle.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
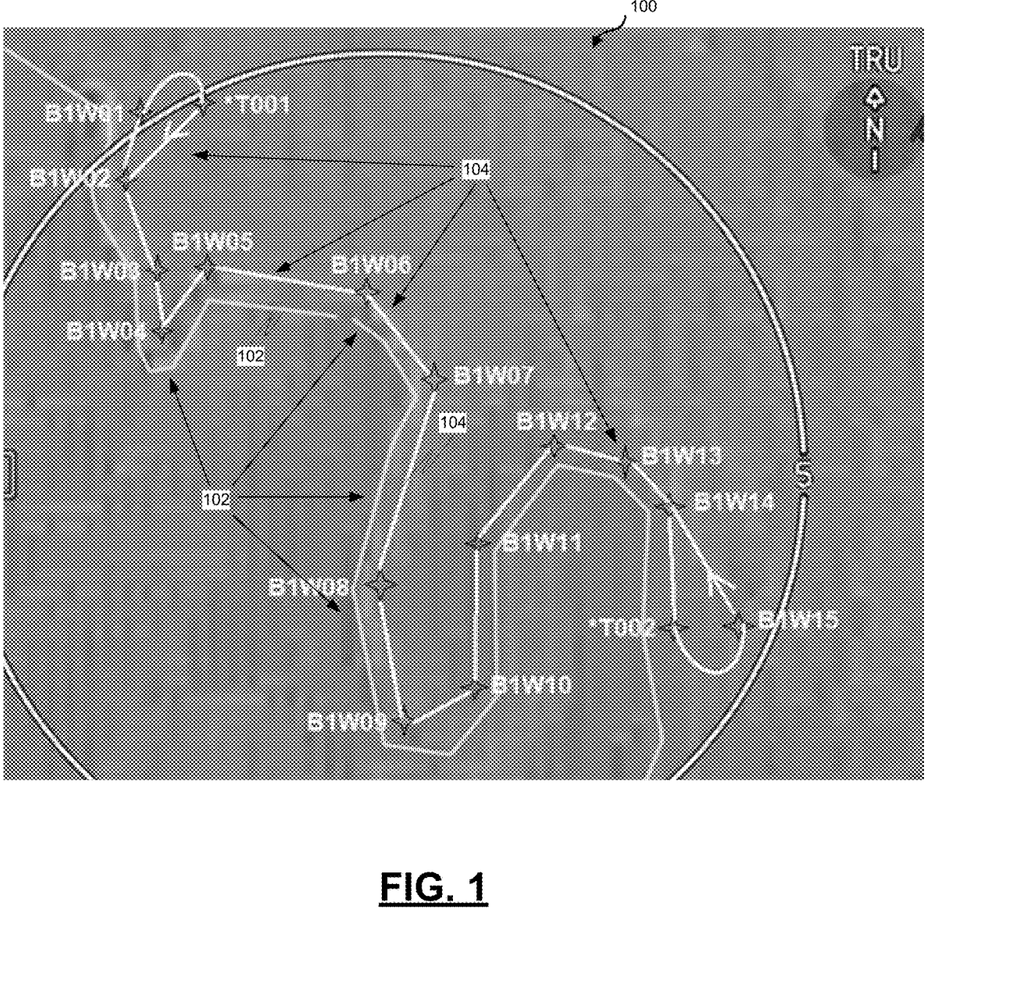
FIG. 1 is a diagram depicting an example map of area around which an aerial vehicle is to fly, in accordance with some embodiments.

The subject matter described herein discloses apparatus, systems, techniques and articles for automatically constructing a flight plan for an aerial vehicle that aligns with a boundary line using information from a geographical database. FIG. 1 is a diagram depicting an example map of area 100 around which an aerial vehicle (e.g., airplane, UAV, drone, helicopter, or other aerial vehicle) is to fly. The area 100 includes a boundary 102 that extends through the area 100. The boundary 102 may be a natural boundary, such as a river or mountain contours, or a governmental boundary, such as a city, county, state or country boundary. The subject matter described herein discloses apparatus, systems, techniques and articles for automatically constructing a flight plan, using geographical database information, for an aerial vehicle to traverse a flight path 104 to follow the boundary 102. The constructed flight plan identifies a starting location B1W01 for the aerial vehicle and an ending location T002 for the flight path 104, a plurality of waypoints B1W02 to B1W14 in a forward direction between the starting location B1W01 and the ending location T002 on the flight path 104, a wraparound waypoint B1W15 at the end of the flight path 104 for use by the aerial vehicle to complete a turn to travel back along the flight path 104 in a reverse direction, and a wraparound waypoint T001 at the beginning of the flight path 104 for use by the aerial vehicle to complete a turn to travel back along the flight path 104 in a forward direction. In this example, the flight path 104 does not fall on the boundary 102, but is laterally offset from the boundary 102 by a specified distance, for example, to ensure that the flight path 104 is well within the boundary (e.g., a governmental boundary) by applying a lateral offset of the specified distance to the path.

In this example, the flight path is flown with a course reversal at each end of the route/track 104 to allow for the performance of monitoring or patrolling services. Course reversal can be initiated at either end of the route 104 or in between waypoints. Additionally, the pilot may choose a LEFT or RIGHT turn at any time while flying to initiate a course reversal.

Figure 2:
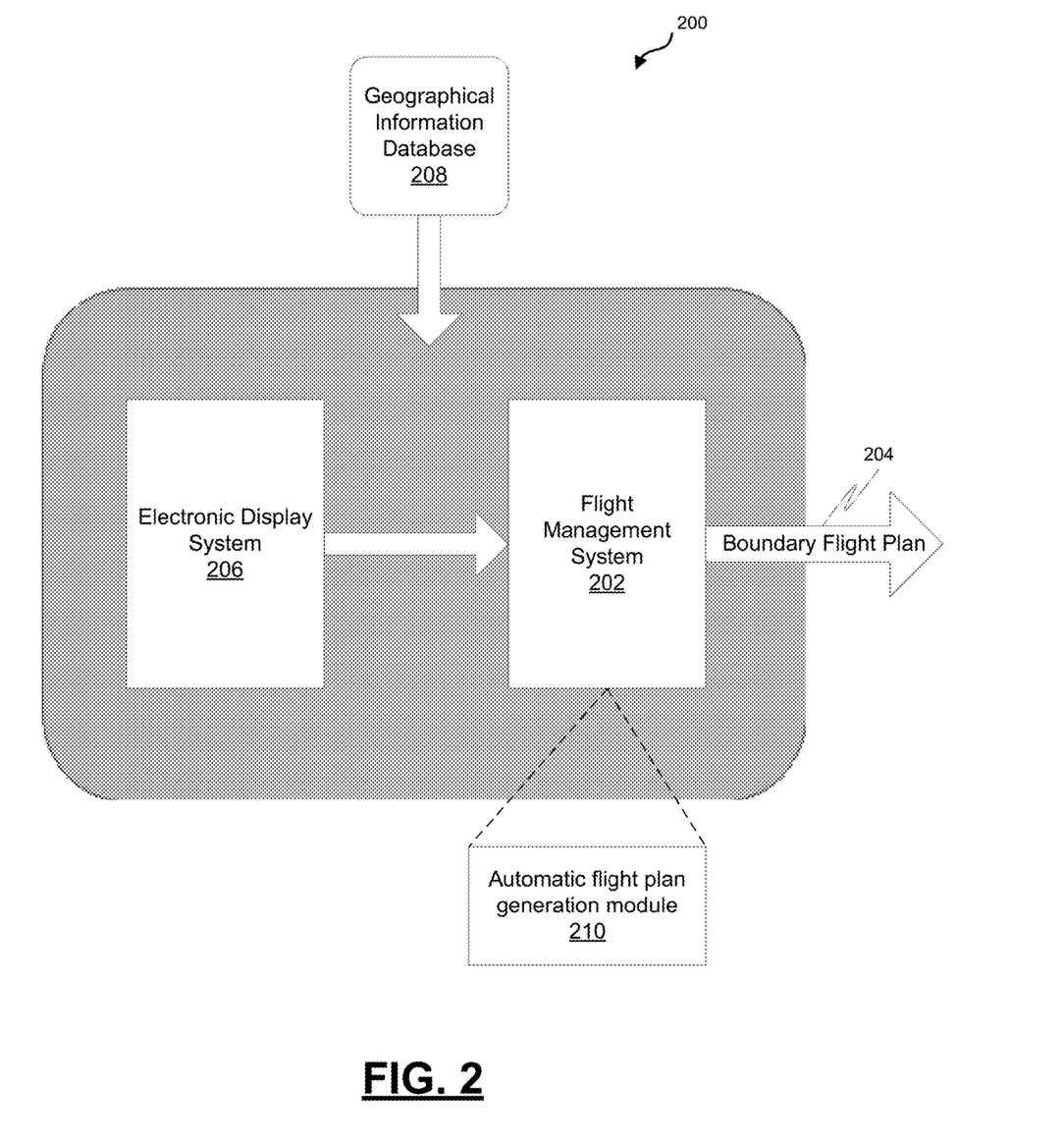
FIG. 2 is a block diagram of an example system for automatically constructing a flight plan, using geographical database information, for an aerial vehicle to traverse a flight path to follow a boundary, in accordance with some embodiments.

FIG. 2 is a block diagram of an example system 200 for automatically constructing a flight plan, using geographical database information, for an aerial vehicle to traverse a flight path to follow a boundary. The example system includes flight deck equipment, such as a flight management system 202 for automatically generating a boundary flight plan 204, an electronic display system 206 for use by flight crew to provide input for the automatic generation of the boundary flight plan, and a geographical database 208 containing potential waypoints along a boundary for consideration when constructing the boundary flight plan 204.

The flight deck equipment 202 has a controller. The controller in this example implements an automatic flight plan generation module 210 that is configured to automatically select a set of geo coordinate waypoints along a boundary line using waypoints from the geographical database 208 responsive to flight crew input from the electronic display system 206.

The controller 210 includes at least one processor and a non-transitory computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example, KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The controller 210 is configured to refine the set of geo coordinate waypoints by computing a turn initiation distance (TID) and a turn completion distance (TCD) for every waypoint. The controller 210 is further configured to refine the set of geo coordinate waypoints, for each waypoint in the set of geo coordinate waypoints, when the sum of the TID for the particular waypoint and the TCD for the prior waypoint in the set of geo coordinate waypoints is greater than a distance between the prior waypoint and the particular waypoint, by removing the particular waypoint from the set of geo coordinate waypoints, connecting the prior waypoint to the next waypoint in the set of geo coordinate waypoints, and re-computing the course and distance between the prior waypoint to the next waypoint.

The controller 210 is further configured to refine the refined set of geo coordinate waypoints by computing a course change at every waypoint from the refined set of geo coordinate waypoints, retaining a waypoint from the refined set of geo coordinate waypoints when the course change at the waypoint is greater than a predetermined amount (e.g., three (3) degrees), and removing a waypoint from the refined set of geo coordinate waypoints when the course change at the waypoint is not greater than the predetermined amount.

The controller 210 is configured to generate a set of courses and distances between waypoints through computing, for each set of two consecutive waypoints in the further refined set of geo coordinate waypoints, the course and distance between the two consecutive waypoints. The controller 210 is configured to construct the flight plan based on the waypoints in the further refined set of geo coordinate waypoints and the set of courses and distances between waypoints to produce a flight plan that may be flown by the aerial vehicle along a flight path that traverses the boundary, or a portion thereof.

To produce an offset flight path along a boundary, the controller 210 is further configured to construct a set of offset flight plan waypoints from the further refined set of geo coordinate waypoints when a lateral offset distance is requested for the waypoints by projecting each waypoint from the further refined set of geo coordinate waypoints by the lateral offset distance at a waypoint bisector for the waypoint.

The controller 210 is configured to refine the set of offset flight plan waypoints by computing the TID and TCD at every offset waypoint transition. The controller 210 is further configured to refine the set of offset flight plan waypoints, when the sum of the TID for a particular waypoint and the TCD for the prior waypoint is greater than a distance between the prior waypoint and the particular waypoint, by removing the particular waypoint and connecting the prior waypoint to the next waypoint.

The controller 210 is further configured to generate a set of courses and distances between offset waypoints through computing, for each set of two consecutive waypoints in the refined set of offset waypoints, the course and distance between the two consecutive waypoints. The controller 210 is further configured to construct the flight plan using the waypoints in the further refined set of offset flight plan waypoints and the set of courses and distances between offset waypoints.

The controller 210 in some examples is further configured to adjust the boundary flight plan and/or offset flight plan based on addition flight planning factors such as weather, NOTAMS, Airspace restrictions, terrain in the anticipated flight path, and others. For example, the controller 210 is further configured to adjust the construction of the flight path laterally and vertically by considering weather data inputs. The controller 210 is further configured to adjust the construction of the flight path laterally and vertically by considering Terrain database inputs. The controller 210 is further configured to adjust the construction of the flight path laterally and vertically by considering Airspace restrictions. The controller 210 is further configured to adjust the construction of the flight path laterally and vertically by considering NOTAM inputs.

The flight crew input received via the electronic display system (e.g., by graphically selecting it on the Display or manually entering it on MCDU or equivalent device) may include (i) flight crew selection of an origin point, a destination point, and the identity of a boundary line along which the aerial vehicle is to fly; (ii) flight crew selection of the identity of a boundary line along which the aerial vehicle is to fly and a distance; or (iii) simply flight crew selection of the identity of a boundary line along which the aerial vehicle is to fly.

When the flight crew input comprises flight crew selection of an origin point, a destination point, and the identity of a boundary line along which the aerial vehicle is to fly, to automatically select a set of geo coordinate waypoints, the controller 210 is configured to automatically select a boundary segment from the identified boundary line between the origin point and the destination point, and construct a flight plan with a course reversal along the boundary segment using waypoints from the geographical database that are along the boundary segment and between the origin point and the destination point.

When the flight crew input comprises flight crew selection of the identity of a boundary line along which the aerial vehicle is to fly and a distance, to automatically select a set of geo coordinate waypoints, the controller 210 is configured to automatically select the current position of the aerial vehicle as the origin, and construct a flight plan with a course reversal along the boundary line from the origin point for the specified distance using waypoints from the geographical database that are along the boundary line for the specified distance.

When the flight crew input comprises flight crew selection of the identity of a boundary line along which the aerial vehicle is to fly, to automatically select a set of geo coordinate waypoints, the controller 210 is configured to automatically construct a flight plan with a course reversal along the complete length of the boundary line using waypoints from the geographical database that are along the boundary line.

Figure 3:
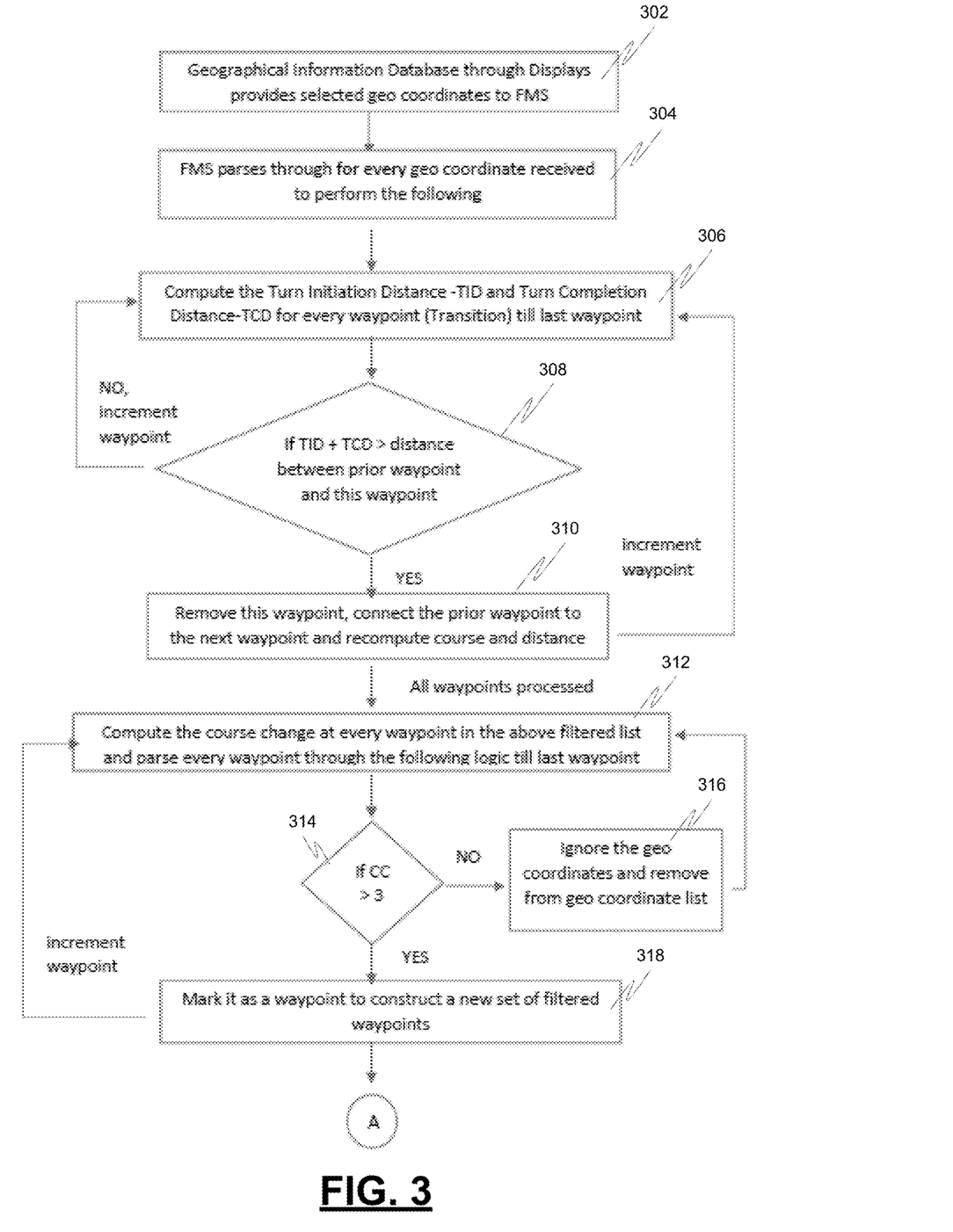
FIG. 3 is a process flow chart depicting an example process in flight deck equipment for automatically generating a boundary flight plan, in accordance with some embodiments.

FIG. 3 is a process flow chart depicting an example process 300 in flight deck equipment for automatically generating a boundary flight plan. In the example process 300, flight deck equipment (e.g., the FMS) is provided with geographical (geo) coordinate waypoints from a geographical information database (operation 302). In one example, the provision is done as a result of pilot or flight crew member selection of a boundary line, river, mountain contour, or other search criteria from geographical database segments that are displayed on a navigational display.

In the example process 300, the flight deck equipment (e.g., the FMS) parses through and performs the operations that follow this operation for each received geo coordinate waypoint (operation 304). To do this the flight deck equipment (e.g., the FMS) receives the set of geo coordinate waypoints and processes it using the operations that follow this operation to automatically construct a flight plan to perform navigation over the coordinate waypoints chosen during the following operations.

The example process 300 includes refining the set of geo coordinate waypoints by applying a first filtering algorithm for the entire set of waypoints. The first filtering algorithm includes computing transition data, Turn initiation distance (TID) and Turn completion distance (TCD), at every waypoint transition (operation 306). The first filtering algorithm also includes determining if the sum of the TID for a current processed waypoint and the TCD of the prior processed waypoint is greater than the distance between the prior waypoint and the current waypoint (decision 308).

If the sum of the TID for a current processed waypoint and the TCD of the prior processed waypoint is greater than the distance between the prior waypoint and the current waypoint (yes at decision 308), then the process 300 includes removing this current waypoint from the set, connecting the prior waypoint to the next waypoint in the set, re-computing the course and distance between these newly connected waypoints (operation 310) and performing operation 306 using the next waypoint in the set of waypoints. If the sum of the TID for a current processed waypoint and the TCD of the prior processed waypoint is not greater than the distance between the prior waypoint and the current waypoint (no at decision 308), then the process 300 includes performing operation 306 using the next waypoint in the set of waypoints.

When all waypoints in the set have been processed (when the first filtering algorithm is complete), the example process 300 includes refining the filtered set of geo coordinate waypoints by applying a second filtering algorithm for the entire set of filtered waypoints. The second filtering algorithm includes computing the course change at every waypoint for the filtered series of waypoints (operation 312) and determining for each waypoint whether the course change is greater than 3 degrees (decision 314).

If the course change at a waypoint is not greater than 3 degrees (no at decision 314), then the example process 300 includes discarding the waypoint (operation 316). If the course change at a waypoint is greater than 3 degrees (yes at decision 314), then the example process 300 includes retaining that waypoint to create a more-refined list of waypoints (operation 318). The example process 300 includes repeating operation 312 using the next waypoint until all waypoints have been processed. The more-refined list of waypoints are used in the boundary flight plan.

Figure 4:
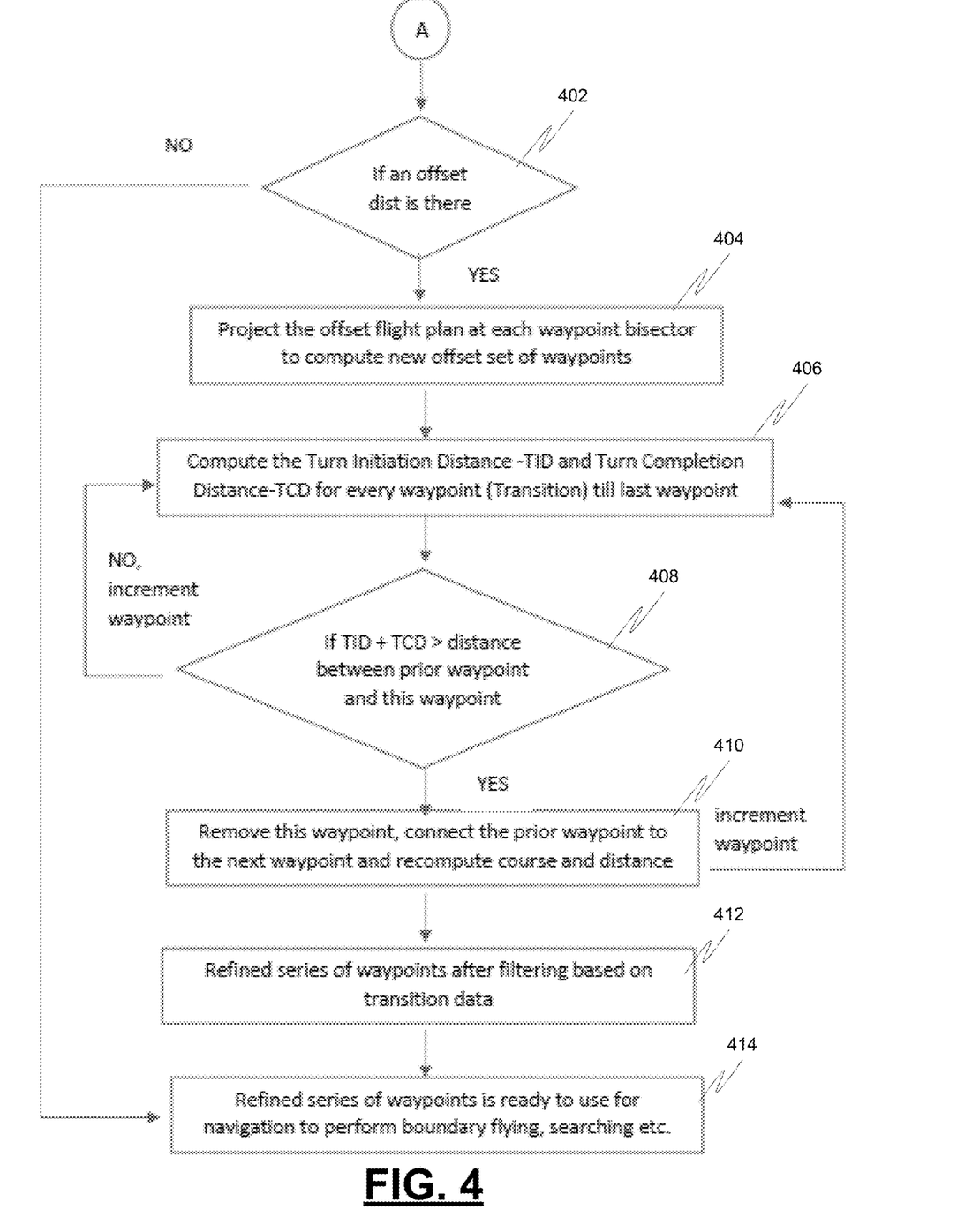
FIG. 4 is a process flow chart depicting an example process in the flight deck equipment for automatically generating an offset flight plan from a boundary flight plan, in accordance with some embodiments.

FIG. 4 is a process flow chart depicting an example process 400 in the flight deck equipment for automatically generating an offset flight plan from the boundary flight plan. The example process 400 includes determining if an offset distance is requested for the waypoints (decision 402). If an offset distance is requested (yes at decision 402), then the lateral offset distance is applied to the waypoints in the boundary flight plan to project the waypoints at each waypoint bisector by the lateral offset distance (operation 404). If an offset distance is not requested (no at decision 402), then the boundary flight plan is used.

The example process 300 includes refining the set of offset waypoints by applying a third filtering algorithm for the entire set of waypoints. The third filtering algorithm includes computing transition data, Turn initiation distance (TID) and Turn completion distance (TCD), at every waypoint transition (operation 406). The third filtering algorithm also includes determining if the sum of the TID for a current processed waypoint and the TCD of the prior processed waypoint is greater than the distance between the prior waypoint and the current waypoint (decision 408).

If the sum of the TID for a current processed waypoint and the TCD of the prior processed waypoint is greater than the distance between the prior waypoint and the current waypoint (yes at decision 408), then the process 400 includes removing this current waypoint from the set, connecting the prior waypoint to the next waypoint in the set, re-computing the course and distance between these newly connected waypoints (operation 410), and performing operation 406 using the next waypoint in the set of waypoints. If the sum of the TID for a current processed waypoint and the TCD of the prior processed waypoint is not greater than the distance between the prior waypoint and the current waypoint (no at decision 408), then the process 400 includes performing operation 406 using the next waypoint in the set of waypoints.

Removing the current waypoint from the set, connecting the prior waypoint to the next waypoint in the set, and re-computing the course and distance between these newly connected waypoints (operation 410) results in a refined series of waypoints (412).

The refined series of waypoints (412) are used in the offset flight plan and can be used for navigation to perform boundary flying, searching, and other tasks (operation 414). The offset flight plan is automatically constructed and can be used to perform boundary monitoring, flying through rivers, mountain contours, search criteria, and others.

Figure 5:
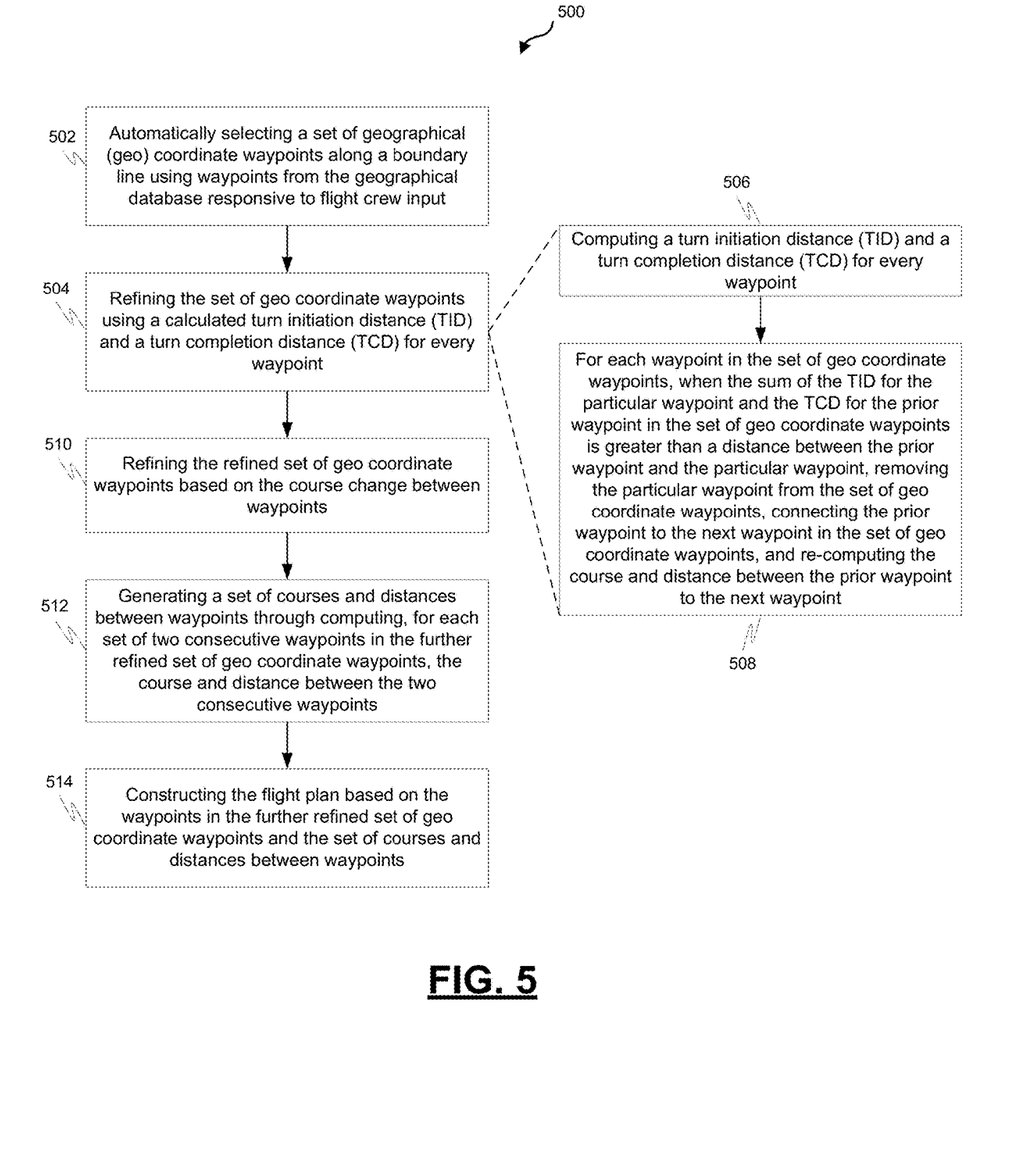
FIG. 5 is a process flow chart depicting another example process in flight deck equipment for automatically generating a boundary, in accordance with some embodiments.

FIG. 5 is a process flow chart depicting an example process 500 in flight deck equipment for automatically generating a boundary flight plan. The order of operation within the process 500 is not limited to the sequential execution as illustrated in the figure, but may be performed in one or more varying orders as applicable and in accordance with the present disclosure.

The example process 500 includes automatically selecting a set of geographical (geo) coordinate waypoints along a boundary line using waypoints from the geographical database responsive to flight crew input (operation 502).

The example process 500 includes refining the set of geo coordinate waypoints using a calculated turn initiation distance (TID) and a turn completion distance (TCD) for every waypoint (operation 504). Refining the set of geo coordinate waypoints includes computing a turn initiation distance (TID) and a turn completion distance (TCD) for every waypoint (operation 506) and for each waypoint in the set of geo coordinate waypoints, when the sum of the TID for the particular waypoint and the TCD for the prior waypoint in the set of geo coordinate waypoints is greater than a distance between the prior waypoint and the particular waypoint, removing the particular waypoint from the set of geo coordinate waypoints, connecting the prior waypoint to the next waypoint in the set of geo coordinate waypoints, and re-computing the course and distance between the prior waypoint to the next waypoint (operation 508).

The example process 500 includes further refining the refined set of geo coordinate waypoints based on the course change between waypoints (operation 510). Further refining the refined set of geo coordinate waypoints based on the course change between waypoints may include computing a course change at every waypoint from the refined set of geo coordinate waypoints, retaining a waypoint from the refined set of geo coordinate waypoints when the course change at the waypoint is greater than a predetermined amount, and removing a waypoint from the refined set of geo coordinate waypoints when the course change at the waypoint is not greater than the predetermined amount. The predetermined amount may be 3 degrees.

The example process 500 includes generating a set of courses and distances between waypoints through computing, for each set of two consecutive waypoints in the further refined set of geo coordinate waypoints, the course and distance between the two consecutive waypoints (operation 512).

The example process 500 includes constructing the flight plan based on the waypoints in the further refined set of geo coordinate waypoints and the set of courses and distances between waypoints (operation 514). The flight plan may be flown by the aerial vehicle.

Figure 6:
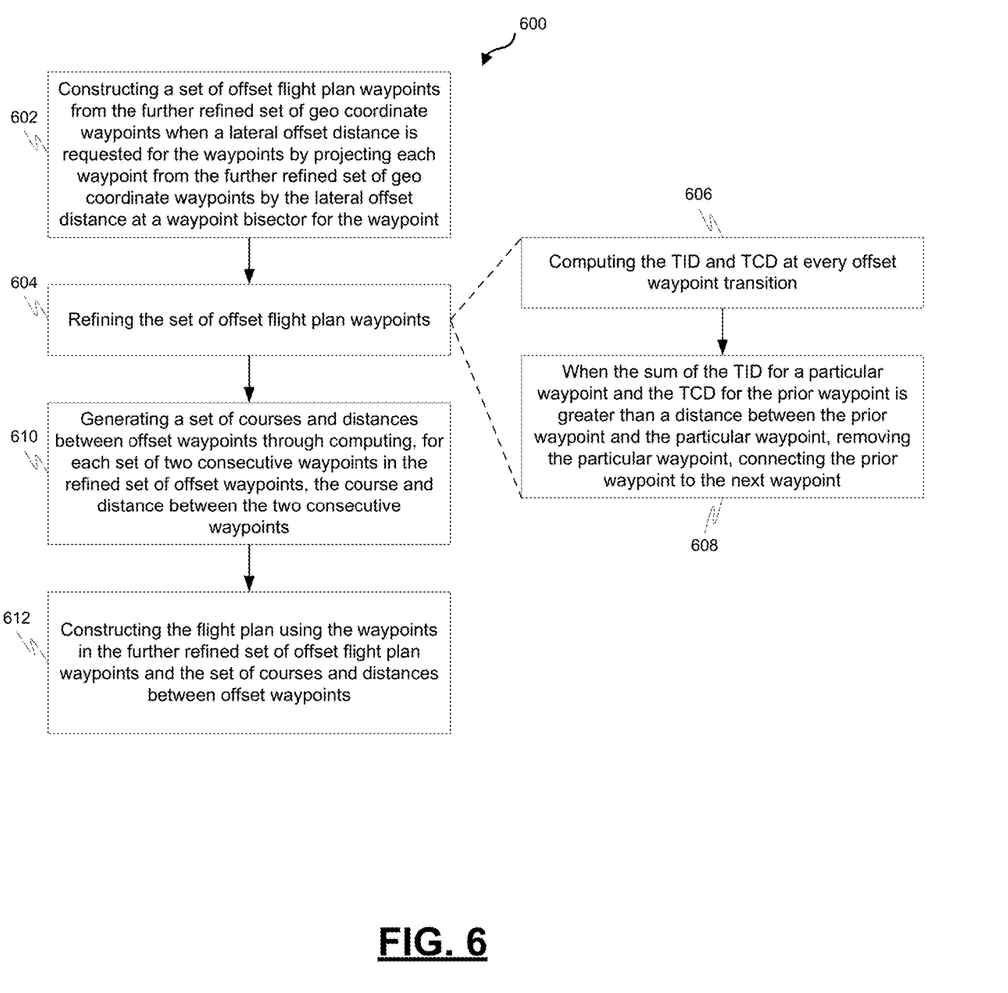
FIG. 6 is a process flow chart depicting another example process in the flight deck equipment for automatically generating an offset flight plan from a boundary flight plan, in accordance with some embodiments.

FIG. 6 is a process flow chart depicting an example process 600 in flight deck equipment for automatically generating an offset flight plan from a boundary flight plan. The example process 600 includes constructing a set of offset flight plan waypoints from the further refined set of geo coordinate waypoints when a lateral offset distance is requested for the waypoints by projecting each waypoint from the further refined set of geo coordinate waypoints by the lateral offset distance at a waypoint bisector for the waypoint (operation 602).

The example process 600 includes refining the set of offset flight plan waypoints (operation 604). Refining the set of offset flight plan waypoints includes computing the TID and TCD at every offset waypoint transition (decision 606) and when the sum of the TID for a particular waypoint and the TCD for the prior waypoint is greater than a distance between the prior waypoint and the particular waypoint, removing the particular waypoint, connecting the prior waypoint to the next waypoint (operation 608).

The example process 600 includes generating a set of courses and distances between offset waypoints through computing, for each set of two consecutive waypoints in the refined set of offset waypoints, the course and distance between the two consecutive waypoints (operation 610).

The example process 600 includes constructing the flight plan using the waypoints in the further refined set of offset flight plan waypoints and the set of courses and distances between offset waypoints (decision 612). The flight plan with the offset waypoints may be flown by the aerial vehicle.

Described herein are apparatus, systems, techniques and articles for automatically constructing a flight plan for an aerial vehicle that aligns with a boundary line using information from a geographical database. In one embodiment, a processor-implemented system for automatically constructing a flight plan for an aerial vehicle that aligns with a boundary line using information from a geographical database is provided. The system has a controller comprising one or more processors configured by programming instructions on non-transitory computer readable media. The controller is configured to: automatically select a set of geographical (geo) coordinate waypoints along a boundary line using waypoints from the geographical database responsive to flight crew input; refine the set of geo coordinate waypoints using a calculated turn initiation distance (TID) and a turn completion distance (TCD) for every waypoint; further refine the refined set of geo coordinate waypoints based on the course change between waypoints; generate a set of courses and distances between waypoints through computing, for each set of two consecutive waypoints in the further refined set of geo coordinate waypoints, the course and distance between the two consecutive waypoints; and construct the flight plan based on the waypoints in the further refined set of geo coordinate waypoints and the set of courses and distances between waypoints. The flight plan is flown by the aerial vehicle.

These aspects and other embodiments may include one or more of the following features. The flight crew input may comprise flight crew selection of an origin point, a destination point, and the identity of a boundary line along which the aerial vehicle is to fly; and to automatically select a set of geo coordinate waypoints, the controller may be configured to automatically select a boundary segment from the identified boundary line between the origin point and the destination point, and construct a flight plan along the boundary segment using waypoints from the geographical database that are along the boundary segment and between the origin point and the destination point. The flight crew input may comprise the identity of a boundary line along which the aerial vehicle is to fly and a distance; and to automatically select a set of geo coordinate waypoints, the controller may be configured to automatically select the current position of the aerial vehicle as the origin, and construct a flight plan along the boundary line from the origin point for the specified distance using waypoints from the geographical database that are along the boundary line for the specified distance. The flight crew input may comprise flight crew selection of the identity of a boundary line along which the aerial vehicle is to fly; and to automatically select a set of geo coordinate waypoints, the controller may be configured to automatically construct a flight plan along the complete length of the boundary line using waypoints from the geographical database that are along the boundary line. To refine the set of geo coordinate waypoints using a calculated turn initiation distance (TID) and a turn completion distance (TCD) for every waypoint, the controller may be configured to refine the set of geo coordinate waypoints by: computing a turn initiation distance (TID) and a turn completion distance (TCD) for every waypoint; and for each waypoint in the set of geo coordinate waypoints, when the sum of the TID for the particular waypoint and the TCD for the prior waypoint in the set of geo coordinate waypoints is greater than a distance between the prior waypoint and the particular waypoint, removing the particular waypoint from the set of geo coordinate waypoints, connecting the prior waypoint to the next waypoint in the set of geo coordinate waypoints, and re-computing the course and distance between the prior waypoint to the next waypoint. The predetermined amount may be 3 degrees. The controller may be further configured to construct a set of offset flight plan waypoints from the further refined set of geo coordinate waypoints when a lateral offset distance is requested for the waypoints by projecting each waypoint from the further refined set of geo coordinate waypoints by the lateral offset distance at a waypoint bisector for the waypoint. The controller may be further configured to refine the set of offset flight plan waypoints by: computing the TID and TCD at every offset waypoint transition; and when the sum of the TID for a particular waypoint and the TCD for the prior waypoint is greater than a distance between the prior waypoint and the particular waypoint, removing the particular waypoint, and connecting the prior waypoint to the next waypoint. The controller may be further configured to generate a set of courses and distances between offset waypoints through computing, for each set of two consecutive waypoints in the refined set of offset waypoints, the course and distance between the two consecutive waypoints. The controller may be further configured to construct the flight plan using the waypoints in the further refined set of offset flight plan waypoints and the set of courses and distances between offset waypoints. The controller may be further configured to further refine the refined set of geo coordinate waypoints based on the course change between waypoints by computing a course change at every waypoint from the refined set of geo coordinate waypoints, retaining a waypoint from the refined set of geo coordinate waypoints when the course change at the waypoint is greater than a predetermined amount, and removing a waypoint from the refined set of geo coordinate waypoints when the course change at the waypoint is not greater than the predetermined amount. The controller may be further configured to apply a course reversal at the end of the boundary flight path and ensure that the aerial vehicle does not cross boundary lines. The controller may be further configured to apply a course reversal at a point other than an end point on the flight path along the boundary flight path. The controller may be further configured to adjust the construction of the flight path laterally and vertically by considering weather data inputs. The controller may be further configured to adjust the construction of the flight path laterally and vertically by considering Terrain database inputs. The controller may be further configured to adjust the construction of the flight path laterally and vertically by considering Airspace restrictions. The controller may be further configured to adjust the construction of the flight path laterally and vertically by considering NOTAM inputs.

In another embodiment, a processor-implemented method in flight deck equipment for automatically constructing a flight plan for an aerial vehicle that aligns with a boundary line using information from a geographical database is provided. The method comprises: automatically selecting a set of geographical (geo) coordinate waypoints along a boundary line using waypoints from the geographical database responsive to flight crew input; refining the set of geo coordinate waypoints using a calculated turn initiation distance (TID) and a turn completion distance (TCD) for every waypoint; further refining the refined set of geo coordinate waypoints based on the course change between waypoints; generating a set of courses and distances between waypoints through computing, for each set of two consecutive waypoints in the further refined set of geo coordinate waypoints, the course and distance between the two consecutive waypoints; and constructing the flight plan based on the waypoints in the further refined set of geo coordinate waypoints and the set of courses and distances between waypoints. The flight plan is flown by the aerial vehicle.

These aspects and other embodiments may include one or more of the following features. The flight crew input may comprise flight crew selection of an origin point, a destination point, and the identity of a boundary line along which the aerial vehicle is to fly; and automatically selecting a set of geo coordinate waypoints may comprise automatically selecting a boundary segment from the identified boundary line between the origin point and the destination point, and constructing a flight plan along the boundary segment using waypoints from the geographical database that are along the boundary segment and between the origin point and the destination point. The flight crew input may comprise the identity of a boundary line along which the aerial vehicle is to fly and a distance; and automatically selecting a set of geo coordinate waypoints may comprise automatically selecting the current position of the aerial vehicle as the origin, and constructing a flight plan along the boundary line from the origin point for the specified distance using waypoints from the geographical database that are along the boundary line for the specified distance. The flight crew input may comprise flight crew selection of the identity of a boundary line along which the aerial vehicle is to fly; and automatically selecting a set of geo coordinate waypoints may comprise automatically constructing a flight plan along the complete length of the boundary line using waypoints from the geographical database that are along the boundary line. The refining the set of geo coordinate waypoints using a calculated turn initiation distance (TID) and a turn completion distance (TCD) for every waypoint may comprise refining the set of geo coordinate waypoints by: computing a turn initiation distance (TID) and a turn completion distance (TCD) for every waypoint; and for each waypoint in the set of geo coordinate waypoints, when the sum of the TID for the particular waypoint and the TCD for the prior waypoint in the set of geo coordinate waypoints is greater than a distance between the prior waypoint and the particular waypoint, removing the particular waypoint from the set of geo coordinate waypoints, connecting the prior waypoint to the next waypoint in the set of geo coordinate waypoints, and re-computing the course and distance between the prior waypoint to the next waypoint. The predetermined amount is 3 degrees. The method may further comprise constructing a set of offset flight plan waypoints from the further refined set of geo coordinate waypoints when a lateral offset distance is requested for the waypoints by projecting each waypoint from the further refined set of geo coordinate waypoints by the lateral offset distance at a waypoint bisector for the waypoint. The method may further comprise refining the set of offset flight plan waypoints by: computing the TID and TCD at every offset waypoint transition; and when the sum of the TID for a particular waypoint and the TCD for the prior waypoint is greater than a distance between the prior waypoint and the particular waypoint, removing the particular waypoint, and connecting the prior waypoint to the next waypoint. The method may further comprise generating a set of courses and distances between offset waypoints through computing, for each set of two consecutive waypoints in the refined set of offset waypoints, the course and distance between the two consecutive waypoints. The method may further comprise constructing the flight plan using the waypoints in the further refined set of offset flight plan waypoints and the set of courses and distances between offset waypoints. The method may further comprise further refining the refined set of geo coordinate waypoints based on the course change between waypoints by computing a course change at every waypoint from the refined set of geo coordinate waypoints, retaining a waypoint from the refined set of geo coordinate waypoints when the course change at the waypoint is greater than a predetermined amount, and removing a waypoint from the refined set of geo coordinate waypoints when the course change at the waypoint is not greater than the predetermined amount. The method may further comprise applying a course reversal at the end of the boundary flight path and ensuring that the aerial vehicle does not cross boundary lines. The method may further comprise applying a course reversal at a point other than an end point on the flight path along the boundary flight path. The method may further comprise adjusting the construction of the flight path laterally and vertically by considering weather data inputs. The method may further comprise adjusting the construction of the flight path laterally and vertically by considering Terrain database inputs. The method may further comprise adjusting the construction of the flight path laterally and vertically by considering Airspace restrictions. The method may further comprise adjusting the construction of the flight path laterally and vertically by considering NOTAM inputs.

In another embodiment, non-transitory computer readable media encoded with programming instructions configurable to cause a processor in flight deck equipment to perform a method is provided. The method comprises automatically selecting a set of geographical (geo) coordinate waypoints along a boundary line using waypoints from the geographical database responsive to flight crew input; refining the set of geo coordinate waypoints using a calculated turn initiation distance (TID) and a turn completion distance (TCD) for every waypoint; further refining the refined set of geo coordinate waypoints based on the course change between waypoints; generating a set of courses and distances between waypoints through computing, for each set of two consecutive waypoints in the further refined set of geo coordinate waypoints, the course and distance between the two consecutive waypoints; and constructing the flight plan based on the waypoints in the further refined set of geo coordinate waypoints and the set of courses and distances between waypoints. The flight plan is flown by the aerial vehicle.

These aspects and other embodiments may include one or more of the following features. The flight crew input may comprise flight crew selection of an origin point, a destination point, and the identity of a boundary line along which the aerial vehicle is to fly; and automatically selecting a set of geo coordinate waypoints may comprise automatically selecting a boundary segment from the identified boundary line between the origin point and the destination point, and constructing a flight plan along the boundary segment using waypoints from the geographical database that are along the boundary segment and between the origin point and the destination point. The flight crew input may comprise the identity of a boundary line along which the aerial vehicle is to fly and a distance; and automatically selecting a set of geo coordinate waypoints may comprise automatically selecting the current position of the aerial vehicle as the origin, and constructing a flight plan along the boundary line from the origin point for the specified distance using waypoints from the geographical database that are along the boundary line for the specified distance. The flight crew input may comprise flight crew selection of the identity of a boundary line along which the aerial vehicle is to fly; and automatically selecting a set of geo coordinate waypoints may comprise automatically constructing a flight plan along the complete length of the boundary line using waypoints from the geographical database that are along the boundary line. The refining the set of geo coordinate waypoints using a calculated turn initiation distance (TID) and a turn completion distance (TCD) for every waypoint may comprise refining the set of geo coordinate waypoints by: computing a turn initiation distance (TID) and a turn completion distance (TCD) for every waypoint; and for each waypoint in the set of geo coordinate waypoints, when the sum of the TID for the particular waypoint and the TCD for the prior waypoint in the set of geo coordinate waypoints is greater than a distance between the prior waypoint and the particular waypoint, removing the particular waypoint from the set of geo coordinate waypoints, connecting the prior waypoint to the next waypoint in the set of geo coordinate waypoints, and re-computing the course and distance between the prior waypoint to the next waypoint. The predetermined amount is 3 degrees. The method may further comprise constructing a set of offset flight plan waypoints from the further refined set of geo coordinate waypoints when a lateral offset distance is requested for the waypoints by projecting each waypoint from the further refined set of geo coordinate waypoints by the lateral offset distance at a waypoint bisector for the waypoint. The method may further comprise refining the set of offset flight plan waypoints by: computing the TID and TCD at every offset waypoint transition; and when the sum of the TID for a particular waypoint and the TCD for the prior waypoint is greater than a distance between the prior waypoint and the particular waypoint, removing the particular waypoint, and connecting the prior waypoint to the next waypoint. The method may further comprise generating a set of courses and distances between offset waypoints through computing, for each set of two consecutive waypoints in the refined set of offset waypoints, the course and distance between the two consecutive waypoints. The method may further comprise constructing the flight plan using the waypoints in the further refined set of offset flight plan waypoints and the set of courses and distances between offset waypoints. The method may further comprise further refining the refined set of geo coordinate waypoints based on the course change between waypoints by computing a course change at every waypoint from the refined set of geo coordinate waypoints, retaining a waypoint from the refined set of geo coordinate waypoints when the course change at the waypoint is greater than a predetermined amount, and removing a waypoint from the refined set of geo coordinate waypoints when the course change at the waypoint is not greater than the predetermined amount. The method may further comprise applying a course reversal at the end of the boundary flight path and ensuring that the aerial vehicle does not cross boundary lines. The method may further comprise applying a course reversal at a point other than an end point on the flight path along the boundary flight path. The method may further comprise adjusting the construction of the flight path laterally and vertically by considering weather data inputs. The method may further comprise adjusting the construction of the flight path laterally and vertically by considering Terrain database inputs. The method may further comprise adjusting the construction of the flight path laterally and vertically by considering Airspace restrictions. The method may further comprise adjusting the construction of the flight path laterally and vertically by considering NOTAM inputs.

In another embodiment, a processor-implemented system for automatically constructing a flight plan for an aerial vehicle that aligns with a boundary line using information from a geographical database is provided. The system is configured to identify a set of geo coordinate waypoints by: responsive to receiving flight crew selection of an origin point, a destination point, and the identity of a boundary line along which the aerial vehicle is to fly, automatically selecting a boundary segment from the identified boundary line between the origin point and the destination point, and constructing a flight plan along the boundary segment using waypoints from the geographical database that are along the boundary segment and between the origin point and the destination point; responsive to receiving flight crew selection of the identity of a boundary line along which the aerial vehicle is to fly and a distance, automatically selecting the current position as the origin, and constructing a flight plan along the boundary line from the origin point for the specified distance using waypoints from the geographical database that are along the boundary line for the specified distance; and responsive to receiving flight crew selection of the identity of a boundary line along which the aerial vehicle is to fly, automatically constructing a flight plan along the complete length of the boundary line using waypoints from the geographical database that are along the boundary line. The system is further configured to refine the set of geo coordinate waypoints by: computing a turn initiation distance (TID) and a turn completion distance (TCD) for every waypoint; and when the sum of the TID for a particular waypoint and the TCD for the prior waypoint is greater than a distance between the prior waypoint and the particular waypoint, removing the particular waypoint, connecting the prior waypoint to the next waypoint, and re-computing the course and distance between the prior waypoint to the next waypoint. The system is further configured to further refine the refined set of geo coordinate waypoints by computing a course change at every waypoint from the refined set of geo coordinate waypoints, retaining a waypoint from the refined set of geo coordinate waypoints when the course change at the waypoint is greater than 3 degrees, and removing a waypoint from the refined set of geo coordinate waypoints when the course change at the waypoint is not greater than 3 degrees; compute, for each waypoint in the further refined set of geo coordinate waypoints, the course and distance between a prior waypoint and a next waypoint; construct a set of offset flight plan waypoints from the further refined set of geo coordinate waypoints when a lateral offset distance is requested for the waypoints by projecting each waypoint from the further refined set of geo coordinate waypoints by the lateral offset distance at a waypoint bisector for the waypoint; and refine the set of offset flight plan waypoints by: computing the TID and TCD at every offset waypoint transition; and when the sum of the TID for a particular waypoint and the TCD for the prior waypoint is greater than a distance between the prior waypoint and the particular waypoint, removing the particular waypoint, connecting the prior waypoint to the next waypoint, and re-computing the course and distance between the prior waypoint to the next waypoint.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented system for automatically constructing a flight plan for an aerial vehicle that aligns with a boundary line using information from a geographical database, the system having a controller comprising one or more processors configured by programming instructions on non-transitory computer readable media, the controller configured to:

automatically select a set of geographical (geo) coordinate waypoints along a boundary line using waypoints from the geographical database responsive to flight crew input;

determine a first subset of the set of geo coordinate waypoints based on a calculated turn initiation distance (TID) and a turn completion distance (TCD) for every waypoint;

determine a second subset of geo coordinate waypoints based on a course change between waypoints;

generate a set of courses and distances between waypoints through computing, for each set of two consecutive waypoints in the second subset of geo coordinate waypoints, the course and distance between the two consecutive waypoints; and construct the flight plan based on the waypoints in the second subset of geo coordinate waypoints and the set of courses and distances between waypoints;

wherein the flight plan is flown by the aerial vehicle.

2. The processor-implemented system of claim 1, wherein:
the flight crew input comprises flight crew selection of an origin point, a destination point, and an identity of a boundary line along which the aerial vehicle is to fly; and
to automatically select a set of geo coordinate waypoints, the controller is configured to automatically select a boundary segment from the boundary line between the origin point and the destination point, and construct a flight plan along the boundary segment using waypoints from the geographical database that are along the boundary segment and between the origin point and the destination point.

3. The processor-implemented system of claim 1, wherein:
the flight crew input comprises an identity of a boundary line along which the aerial vehicle is to fly and a distance; and
to automatically select a set of geo coordinate waypoints, the controller is configured to automatically select a current position of the aerial vehicle as an origin point, and construct a flight plan along the boundary line from the origin point for a specified distance using waypoints from the geographical database that are along the boundary line for the specified distance.

4. The processor-implemented system of claim 1, wherein:
the flight crew input comprises flight crew selection of an identity of a boundary line along which the aerial vehicle is to fly; and
to automatically select a set of geo coordinate waypoints, the controller is configured to automatically construct a flight plan along a complete length of the boundary line using waypoints from the geographical database that are along the boundary line.

5. The processor-implemented system of claim 1, wherein to refine the set of geo coordinate waypoints using a calculated turn initiation distance (TID) and a turn completion distance (TCD) for every waypoint, the controller is configured to refine the set of geo coordinate waypoints by:
computing a turn initiation distance (TID) and a turn completion distance (TCD) for every waypoint; and
for each waypoint in the set of geo coordinate waypoints, when a sum of the TID for a particular waypoint and the TCD for a prior waypoint in the set of geo coordinate waypoints is greater than a distance between the prior waypoint and the particular waypoint, removing the particular waypoint from the set of geo coordinate waypoints, connecting the prior waypoint to a next waypoint in the set of geo coordinate waypoints, and re-computing the course and distance between the prior waypoint to the next waypoint.

6. The processor-implemented system of claim 1, wherein the controller is further configured to construct a set of offset flight plan waypoints from the second subset of geo coordinate waypoints when a lateral offset distance is requested for the waypoints by projecting each waypoint from the second subset of geo coordinate waypoints by the lateral offset distance at a waypoint bisector for the waypoint.

7. The processor-implemented system of claim 6, wherein the controller is further configured to refine the set of offset flight plan waypoints by:
computing the TID and TCD at every offset waypoint transition; and
when a sum of the TID for a particular waypoint and the TCD for a prior waypoint is greater than a distance between the prior waypoint and the particular waypoint, removing the particular waypoint, and connecting the prior waypoint to a next waypoint.

8. The processor-implemented system of claim 7, wherein the controller is further configured to:
generate a set of courses and distances between offset waypoints through computing, for each set of two consecutive waypoints in the refined set of offset flight plan waypoints, the course and distance between the two consecutive waypoints; and
construct the flight plan using the waypoints in the refined set of offset flight plan waypoints and the set of courses and distances between offset waypoints.

9. The processor-implemented system of claim 1, wherein the controller is further configured to determine the second subset of geo coordinate waypoints based on the course change between waypoints by computing a course change at every waypoint from the first subset of geo coordinate waypoints, retaining a waypoint from the first subset of geo coordinate waypoints when the course change at the waypoint is greater than a predetermined amount, and removing a waypoint from the first subset of geo coordinate waypoints when the course change at the waypoint is not greater than the predetermined amount.

10. The processor-implemented system of claim 1, wherein the controller is further configured to apply a course reversal at an end of a boundary flight path and ensure that the aerial vehicle does not cross boundary lines.

11. The processor-implemented system of claim 1, wherein the controller is further configured to apply a course reversal at a point other than an end point on a flight path along a boundary flight path.

12. The processor-implemented system of claim 1, wherein the controller is further configured to adjust the construction of a flight path laterally and vertically by considering weather data inputs.

13. The processor-implemented system of claim 1, wherein the controller is further configured to adjust the construction of a flight path laterally and vertically by considering Terrain database inputs.

14. The processor-implemented system of claim 1, wherein the controller is further configured to adjust the construction of a flight path laterally and vertically by considering Airspace restrictions.

15. The processor-implemented system of claim 1, wherein the controller is further configured to adjust the construction of a flight path laterally and vertically by considering NOTAM inputs.

16. A processor-implemented method in flight deck equipment for automatically constructing a flight plan for an aerial vehicle that aligns with a boundary line using information from a geographical database, the method comprising:
automatically selecting a set of geographical (geo) coordinate waypoints along a boundary line using waypoints from the geographical database responsive to flight crew input;
determining a first subset of the set of geo coordinate waypoints based on a calculated turn initiation distance (TID) and a turn completion distance (TCD) for every waypoint;
determining a second subset of geo coordinate waypoints based on a course change between waypoints;

generating a set of courses and distances between waypoints through computing, for each set of two consecutive waypoints in the second subset of geo coordinate waypoints, the course and distance between the two consecutive waypoints; and constructing the flight plan based on the waypoints in the second subset of geo coordinate waypoints and the set of courses and distances between waypoints;

wherein the flight plan is flown by the aerial vehicle.

17. The method of claim 16, further comprising constructing a set of offset flight plan waypoints from the second subset of geo coordinate waypoints when a lateral offset distance is requested for the waypoints by projecting each waypoint from the second subset of geo coordinate waypoints by the lateral offset distance at a waypoint bisector for the waypoint.

18. The method of claim 17, further comprising refining the set of offset flight plan waypoints by:

computing the TID and TCD at every offset waypoint transition; and when a sum of the TID for a particular waypoint and the TCD for a prior waypoint is greater than a distance between the prior waypoint and the particular waypoint, removing the particular waypoint, and connecting the prior waypoint to a next waypoint.

19. The method of claim 18, further comprising:

generating a set of courses and distances between offset waypoints through computing, for each set of two consecutive waypoints in the refined set of offset flight plan waypoints, the course and distance between the two consecutive waypoints; and constructing the flight plan using the waypoints in the refined set of offset flight plan waypoints and the set of courses and distances between offset waypoints.

20. Non-transitory computer readable media encoded with programming instructions configurable to cause a processor in flight deck equipment to perform a method, the method comprising:

automatically selecting a set of geographical (geo) coordinate waypoints along a boundary line using waypoints from a geographical database responsive to flight crew input;

determining a first subset of the set of geo coordinate waypoints based on a calculated turn initiation distance (TID) and a turn completion distance (TCD) for every waypoint;

determining a second subset of geo coordinate waypoints based on a course change between waypoints;

generating a set of courses and distances between waypoints through computing, for each set of two consecutive waypoints in the second subset of geo coordinate waypoints, the course and distance between the two consecutive waypoints; and constructing a flight plan based on the waypoints in the second subset of geo coordinate waypoints and the set of courses and distances between waypoints;

wherein the flight plan is flown by an aerial vehicle.

* * * * *